US006889899B2

(12) United States Patent
Silberberg

(10) Patent No.: US 6,889,899 B2
(45) Date of Patent: May 10, 2005

(54) VEHICLE PARKING SYSTEM

(75) Inventor: Michael E. Silberberg, South Melbourne (AU)

(73) Assignee: CDS Worldwide Pty Ltd, South Melbourne (AU)

(*) Notice: Subject to any disclaimer, the term of this patent is extended or adjusted under 35 U.S.C. 154(b) by 69 days.

(21) Appl. No.: 10/204,834

(22) PCT Filed: Feb. 23, 2001

(86) PCT No.: PCT/AU01/00192
§ 371 (c)(1),
(2), (4) Date: Aug. 23, 2002

(87) PCT Pub. No.: WO01/63563
PCT Pub. Date: Aug. 30, 2001

(65) Prior Publication Data
US 2003/0010821 A1 Jan. 16, 2003

(30) Foreign Application Priority Data
Feb. 24, 2000 (AU) .............................. PQ 5836

(51) Int. Cl.⁷ .............................................. G07B 15/02
(52) U.S. Cl. ..................... 235/384; 235/375; 705/418
(58) Field of Search ............................... 235/384, 380, 235/379, 375; 705/418; 194/217, 902

(56) References Cited
U.S. PATENT DOCUMENTS

| 5,155,614 A | * | 10/1992 | Carmen et al. ............. 359/189 |
| 5,351,187 A | | 9/1994 | Hassett |
| 5,617,942 A | * | 4/1997 | Ward, II et al. ............ 194/217 |
| 5,648,906 A | | 7/1997 | Amirpanahi |
| 5,737,710 A | | 4/1998 | Anthonyson |
| 5,841,369 A | | 11/1998 | Sutton et al. |
| 6,312,152 B2 | * | 11/2001 | Dee et al. ..................... 368/90 |

FOREIGN PATENT DOCUMENTS

| WO | WO 96/27170 | 9/1996 |
| WO | WO 96/34366 | 10/1996 |
| WO | WO 97/13222 | 4/1997 |
| WO | WO 98/04080 | 1/1998 |
| WO | WO 99/48062 | 9/1999 |
| WO | WO 00/11616 | 3/2000 |

* cited by examiner

Primary Examiner—Karl D. Frech
(74) Attorney, Agent, or Firm—Michael Best & Friedrich LLP

(57) ABSTRACT

A parking system is disclosed which includes a parking meter (10) which has a transceiver (12) and (14) for transmitting and receiving information and which in one embodiment may comprise an over the air telephone, fixed land line telephone or the like. The transmitter receiver (12, 14) communicates with a host central station (50) for receiving and transmitting information. In order to park at the meter a user telephones a telephone number associated with the parking meter and connects with the host station (50). Commands are input into the user's telephone to provide an indication of the amount of parking time required and payment for the parking time and information is downloaded from the station (50) to the parking meter (10) to indicate that parking has been paid for and the parking meter should activate to indicate that parking has been paid for. Parking bays associated with meters may include sensors (22) for indicating the presence of a vehicle and for providing a signal to the parking meter (10) in the event that parking time expires and car is still present in the parking place so that appropriate action can be taken. Other embodiment include communication to the central station via the parking meter (10) rather than direct to the central station (50) and also a system in which parking takes place in a garage or parking station in which communication takes place from a user's telephone to the central station (50) to enable payment and downloading of relevant data to the garage (100) to indicate that parking has been paid for.

26 Claims, 2 Drawing Sheets

VEHICLE PARKING SYSTEM

This invention relates to a vehicle parking system which allows a driver of a vehicle to pay for parking time at a parking meter on a roadway or elsewhere.

Conventionally, parking meters are disposed alongside parking bays on roadways or in other areas where vehicles can be parked. Traditionally, meters have been associated with each parking bay and are coin fed in order to pay for parkage time. In more recent times a single ticket issuing machine may be provided which requires a user to park his or her car, walk to the machine, pay for parking, collect a ticket from the machine and locate the ticket in a visible place within the vehicle to identify the fact that parking has been payed for. Still further systems associated one parking meter with a number of bays and users feed the parking meter by inserting coins into the parking meter and also input information into a keypad identifying the parking bay, of the number of parking bays associated with that parking meter, which is occupied by the user.

All of the conventional systems require considerable manual intervention in order to collect payments from the parking meters and also to monitor illegal parking. Typically, the parking meters must be individually attended by appropriate personal so as to retrieve cash from the parking meters. Furthermore, as is well known parking is generally monitored by parking officers to determine infringement of parking restrictions and overstays at parking meters. Both of these techniques are labour intensive and add to the general infrastructure costs of providing payed parking bays on roadways or other parking stations.

The object of the invention is to provide a parking system which decreases the amount of manual intervention required in order to operate a parking system.

The invention in a first aspect may be said to reside in a parking system, including;
    a parking meter for location in proximity to a parking bay;
    the parking meter having communication means for receipt and/or transmission of data to a remote location; and
    wherein in order to operate the parking meter a user is able to transmit information via a transmitter means so as to active the parking meter and make payment for parking time spent in the parking bay controlled by the parking meter.

Thus, according to this aspect of the invention users can maintain an account with a parking authority which can be activated when data is transmitted via the transmitter means so as to deduct payment from the users account for payment of parking time and also cause the parking meter to register the parking time as been paid for. Since payment is made at the control station, the need for personal to collect payments from the meters is reduced thereby decreasing the infrastructure costs of providing the parking system.

In the preferred embodiment of the invention the transmitter means comprises a user's mobile telephone and the user telephones a telephone number displayed on the parking meter in order to initiate payment and activate the parking meter to indicate that parking has been paid for.

In one embodiment of the invention the users call may be received by a receiver within the parking bay which transmits data to a central location to deduct payment from the user's account.

However, in the preferred embodiment of the invention a central control station is provided which communicates with each of the parking meters in the system and the user telephones the central control unit which deducts payments from the user's account and transmits data to the parking bay to indicate that payment has been made and to activate the parking meter to display that parking has been paid for. In other embodiments the transmitter means may comprise a pager or other communication device providing over the air communication which can be used by a user to contact the parking meter or central station to make payment and activate the parking meter.

In a further aspect the invention may be said to reside in a parking system, including;
    a parking meter for location in proximity to a parking bay, the parking meter having communication means for receiving and transmitting data;
    a central control station for communicating with the communication means of the parking meter; and
    wherein, in use, a user is able to transfer information via a transmitter means to the central control station and input information relating to the parking meter via the transmitter means to the control station whereby the control station transmits data to the communication means of the parking meter to cause the parking meter to indicate that payment has been made for the parking space for a particular time period.

Once again, preferably the transmitter means comprises a mobile telephone but other devices such as pagers or unique over the air transmitters for communicating with the central control station could be utilised.

In one embodiment of the invention the parking meter may also have payment receiving means for receiving cash payments or smart card or credit card payments. Whilst cash payments will require the attendance of a authorised person to collect cash payments from the meter, in view of the fact that payments can be made by credit card or most preferably by the transmitter means as referred to above, the amount of cash collected by each parking meter is reduced thereby reducing the amount of attendances required to collect cash and thus decreasing costs.

Preferably the parking meter includes a display for displaying instructions and information relating to the commencement of parking time and the parking time remaining.

The parking meter may also include an advertising display for displaying advertising material which may be included within the first mentioned display or separate from the first mentioned display.

Preferably the parking meter is associated with a plurality of car parking bays, each car parking bay having a sensor for sensing the presence of a vehicle within the bay so that the parking meter is provided with information as to the presence of a vehicle within a particular bay and the communication means is able to transmit data relating to an overstay of a vehicle within a parking bay to either the central control station or to a separate enforcement office. This can enable the parking officer to be dispatched to a particular bay for the issuing of a parking ticket should that be required.

In a further aspect the invention may be said to reside in a parking meter for a parking system, said parking meter including;
    a communication means for communicating with a remote location so that information can be transmitted from the remote location to the parking meter and received by the communication means to activate the parking meter to show parking has been paid for a predetermined time period.

Preferably the communication means communicates with a central control unit by a wireless communication link.

However, in some embodiments of the invention the communication is between a central control station and the communication means within the parking meter may be by a fixed land line.

In the preferred embodiment of the invention the central control station or the parking meter can transmit a message to the user when the parking period paid for by user has almost expired and a vehicle is still parked in the parking bay, to provide the user with the option of paying for additional parking up to the maximum period which is allowed for that particular parking bay.

For example, should the parking bay be a two hour parking bay and a user initially pay for one hour, if the user's vehicle is still detected in the parking bay after fifty-five minutes the central controller can telephone the user's mobile telephone and display a message indicating that parking time is almost expired and asking for acknowledgment as to whether the meter should be topped up for a further payment period up to one hour which will be the maximum parking time allowed at that meter. The user can respond by inputting an input into the user's transmitter means, such as the mobile telephone, acknowledging that the additional time should be paid for.

This ability to top up the parking meter can take place a number of times depending on the total parking time period for that bay and the amount of time periods paid for by the user. If the user remains at the parking bay for the maximum time period the last message to the user can be that parking time has almost expired and requiring the user to move his or her vehicle or otherwise risk the consequence of a parking fine.

The invention also provides a parking station including;
   a central control station including receiver means for receiving communication from a user;
   a transmitter at the central control station for transmitting data to a parking station;
   a receiver at the parking station for receiving the date from the central control station to provide a data code identifying the user.

The invention also provides a parking payment method including the steps of:
   providing a central facility to which a user can make a telephone call to request parking;
   taking payments for the parking which is required; and
   transmitting information to a parking facility relating to the parking which is required by the user.

The invention also provides a parking payment method including the steps of:
   providing a parking meter which includes communication means for receiving a telephone call from a user;
   receiving a call from a user to initiate parking at the parking meter;
   taking payment for the parking which is required; and
   activating the parking meter to indicate that the parking meter is active and that payment has been made for parking.

Preferred embodiments of the invention will be described, by way of example, with reference to the accompanying drawings in which.

Figure 1:
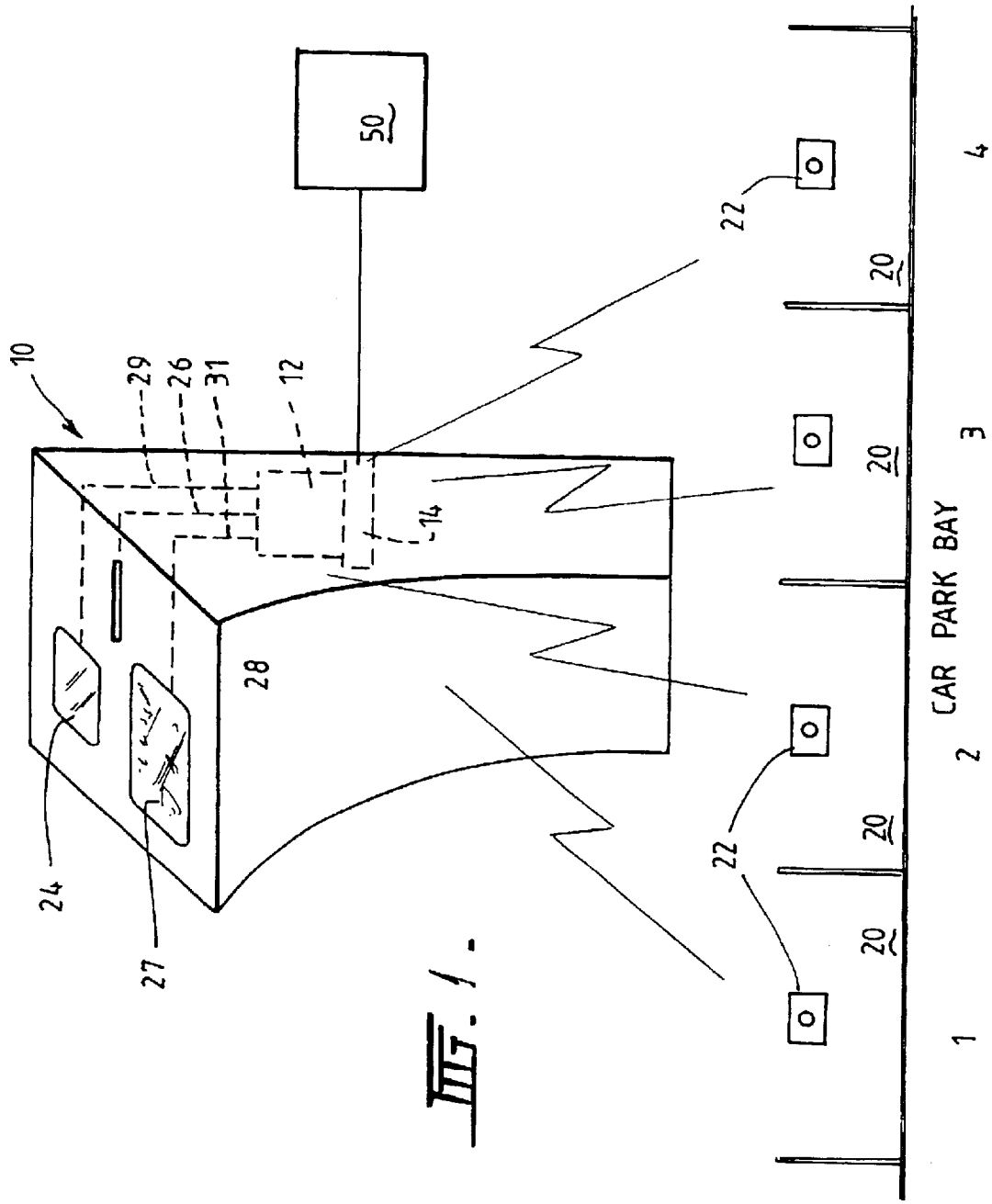
FIG. 1 is a schematic view illustrating the preferred embodiment of the invention.

With reference to FIG. 1 a parking system is shown which includes a plurality of parking meters 10 (only one shown). Each parking meter 10 is associated with a number of parking bays 20 (and numbered car park bay 1 to car park bay 4 for easy identification). The car parking bays may be roadside car parking bays marked by white lines as is conventional and each car parking bay may have a sensor 22 embedded in the parking bay and which can sense the presence of a vehicle within the parking bay and transmit data relating to the presence of vehicle to the parking meter 10.

The parking meter 10 has a processor 12 which includes a telephone receiver 14 for receiving data via the telephone network from a central control station 50 which will include a computer system for recording transactions and also outputting information to each of the parking meters. Each of the parking meters 10 will have a unique identifying telephone number which can be dialled by the station 50 so that information can be transmitted from the station 50 to the appropriate telephone receiver 14 associated with a parking meter 10. Alternatively, a single telephone number can be associated with a number of parking meters 10 the individual parking meters 10 can be identified by a unique code printed on the parking meter and which can be inputted into the user's telephone to relay that data to the central station 50. The processor 12 is also connected to a display 24 via line 26 and to a card reader or coin slot 28 via line 29. The processor 12 can also connect to an advertising display 27 via line 31.

In order to use the system of the preferred embodiment, users will open an account with the parking authority and will typically deposit money into that account to pay for future parking. The user will be a unique account number which may be associated with the user's telephone number for telephone communication as will be explained hereinafter or an account number printed on a smart card or the like.

Thus, when a user presents at the parking meter 10 and parks in one of the car parking bays 20 marked 1 to 4 in FIG. 1 the first payment option a user has is to user the user's mobile telephone to dial the central control station 50. An appropriate telephone number for the central station can be displayed on the parking meter. When the user dials the telephone number the user is connected to the computer within the central control station 50 where upon the central control station 50 can automatically deduce the user's account number from the user's telephone number which dials the central station or can request the user to input an account number by pushing the keys of the mobile telephone. A unique identifying number will be associated with each parking meter and the user will then be prompted to key in the number of the meter. The user, should the meter be controlling more than one parking bay, will then be asked to key in the parking pay number (such as the number 3) which the user is occupying. The central control station 50 will then communicate with the relevant parking meter 10 by dialling the parking meter so that the central station is in communication with the receiver 14. The telephone communication from the central unit 50 to the receiver 14 can be by mobile telephone link, that this wireless telephone or any appropriate over the air data package network, or could be by a fixed land line such as a conventional PSTN network. The control station 50 will then prompt the user to input a command into the telephone keys the amount of time required. Thus, the user can key into his or her telephone one for one hour, two for two hours or other appropriate commands for other parking times required by the user up to the maximum allowed. The control station 50 then deducts payment from the user's prepaid account and transmits information to the receiver 14 to cause the processor 12 to display on the display 24 that parking has been paid for and the amount of time paid for. The processor 12 will commence a count down of the time remaining for parking and display the time on display 24 so as to clearly indicate that parking has been paid for the appropriate bay.

As an alternative to the user using his telephone to initiate the parking meter 10, a smart card or other card could be inserted into the slot 28 and the processor 12 can receive data from the card and cause the telephone transmitter 14 to dial the central station 50 so that appropriate data is downloaded to the central station 50 for deducting payment from the smart card and/or the user's account. Inputs into the parking meter 10 can by the way of the display 24 which may be provided with touch areas for input of particular commands from the user indicating parking time required and other required data which may be transmitted to the central station 50.

In a still further possibility, a credit card or eftpos card could be inserted into the slot 28 and payment made by eftpos or credit card by transmitting the relevant data from the card to the central station 50 via the telephone connection between the transmitter 14 and the station 50.

In a still further embodiment the credit card details can be transmitted over the mobile phone to the control station 50 so that the credit card details can be taken manually or automatically in order to pay for parking time. In a further possibility a smart card can be associated with the telephone so that when the telephone makes connection with the central station 50, the payment is made by communication between the telephone by downloading information and data from the smart card (that is deducting a payment from the smart card and altering its balance) without the user doing anything other than indicating an amount of time required. The smart card can be topped up and the conventional way by making payments to the authority responsible for the smart card.

When the paid parking time has almost expired and the sensor 22 associated with bay 3 for example, still indicates that the user's car is parked in bay 3, the telephone receiver 14 can dial the central station 50 and indicate that the vehicle is still parked in the parking bay. This will initiate the central station 50 to telephone the users mobile telephone or any other telephone number which is logged with the user's account for the purpose of contact, so as to provide of an indication that parking time has almost expired. This option is available regardless of whether the user initially initiates payment via his mobile telephone or users a smart card or other payment method provided that the user does have an account with a contact number associated with that account. Once the user is contacted via, for example, mobile telephone, the user will be presented with a display indicating that parking time has almost expired and asked whether the user wishes to extend parking time should that be possible. The user can input a command by touching any key indicating that parking time should be extended and the central control station will deduct appropriate payment from the user's account and reactive the parking meter to show that additional parking time has been paid for. This can take place a number of times up to the maximum parking period allowed for that parking bay. When the maximum period is approaching the last warning to the user will be an indication that no more parking time is available to the user to warn the user that the vehicle should be moved from the parking bay.

It is also possible that the slot 28 or a separate slot can be used for coin payment of parking in the conventional manner. Coins fed into the parking meter are detected and an appropriate indication of parking time paid for can be displayed on the display 24 without the need for the telephone transmitter 14 to contact the central station 50. In this embodiment the processor 12 can monitor when the coin box (not shown) associated with the meter is almost full and transmit that data via the telephone receiver 14 to the central station 50 so that the parking meter can be attended by an operator to clear the coin box. Whilst this option does require the attendance of a person to clear the coin box, since other payment options are available the amount of attendance is greatly reduced and furthermore it will only take place when the coin box is full thereby reducing the amount of time and therefore the costs of attending the parking meter to collect coins from the meter.

Advertising material for display on the display 27 may be down fed via the telephone link between the central station 50 and the telephone receiver 14 for display on the display 27 or may from time to time, be programmed into the processor.

If the paid parking time for a particular vehicle in one of the bays expires and the sensor 22 associated with that bay detects that the vehicle is still parked in the bay then a signal can be transmitted to an enforcement office indicating that a parking violation is occurring which may require the attendance of an officer for issuing a parking ticket. Information relating to the presence of the vehicle can be transmitted via the telephone receiver 14 to the control station 50 or alternatively can be transmitted from the telephone receiver 14 to a different number to a specialised enforcement office for action.

As a further alternative, if the vehicle remains in the parking bay 20 after the expiration of the appropriate time period, a parking ticket can automatically be forwarded to the account holder should the vehicle be associated with an account which is charged for the parking space.

The preferred embodiment, has the ability to identify daily amounts of revenue collected by each car parking bay and can also provide appropriate accounts to account holders showing parking time, place of parking and payments deducted from the user's account.

In other embodiments of the invention the parking meter 10 may include a printer so that a receipt can be printed for parking should that be required.

Figure 2:
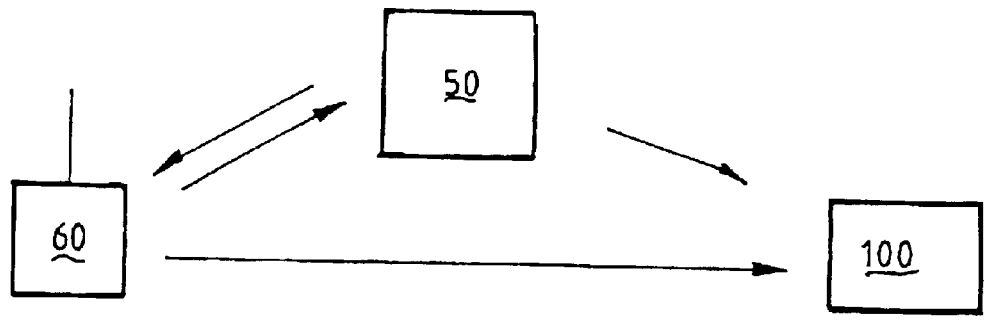
FIG. 2 is a diagram illustrating a second embodiment.

FIG. 2 shows a further embodiment of the invention in which parking is to take place in a parking station in the form of a car park in which payment is normally made during entry into or exit from the car park. In this embodiment the user can communicate with the central station 50 by way of mobile telephone 60 as in the earlier embodiment, except in this embodiment the user does not obviously obtain the telephone number from a parking meter but rather obtains a telephone number from the car park or from any registry, advertisement or from inquiries made by the user. The central station 50 receives information over the air from the mobile telephone concerning the time required for parking and the time parking is to commence and transmits that information to parking station 100. Payment for the time required can be deducted from the user's account in then same manner as described with reference to FIG. 1, or alternatively, payment can be made by any of the other methods previously referred to including credit card payment in which credit card details are transmitted either automatically from the mobile phone or by the user keying numbers into the mobile phone. Alternatively, as will be described in more detail with reference to FIG. 3, payment can be made from a Smart Card or SIM Card associated with the telephone 60 and which carries a cash balance which is reduced in accordance with the cost of the parking. Once payment has been verified by the central station 50 the central station 50 transmits a code back to the telephone 60 which acts as a virtual receipt to indicate that parking has been paid for. The code also acts as a code allowing entry into the parking station 100 when the user presents at the parking station 100.

Thus, when the user arrives at the parking station 100, the user can telephone the number of the parking station 100 which is displayed on the parking station and transmit the code received from the central station 50 by a SME text message or the like by way of a mobile telephone call to the station 100. The code which was transmitted to the user's telephone 60 from the central station 50 is also transmitted to the central station 100 so that when the user telephones the parking station 100 upon arrival and transmits the code the code is compared by a computer or server at this station 100 so as to allow access to the parking station. In an alternative embodiment rather than the user having to telephone the parking station 100 to transmit the code, the user can simply key in a coded number or other identifying code which was transmitted back to the mobile telephone 60 from the central station 50, into a keypad at the entry of the car park 100 in order to gain access into the car park 100.

Although it is preferred that payment be made when the user initially telephones the central station 60 from his mobile phone, payment can be made upon arrival at the parking station by credit card, cash or the like. In this case, the purpose of the call to the central station 50 is merely to reserve a parking space so that when the user arrives at the car park the user knows that a parking space will be available. This embodiment can involve transmissions of the codes from the central station 50 to the telephone 60 and to the parking station 100 in the same manner as described above so that the user can gain access by supplying the code to the parking station 100 upon arrival.

This embodiment has particular advantage in that it enables a user to book a parking place for a particular time. If parking is booked in advance, payment may be required to be deducted automatically from the user's account at the station 50 or otherwise paid in advance to ensure that payment is made for the reservation if the user simply does not attend at the required time thereby leaving a vacant space which could otherwise be sold by the parking station 100.

Figure 3:
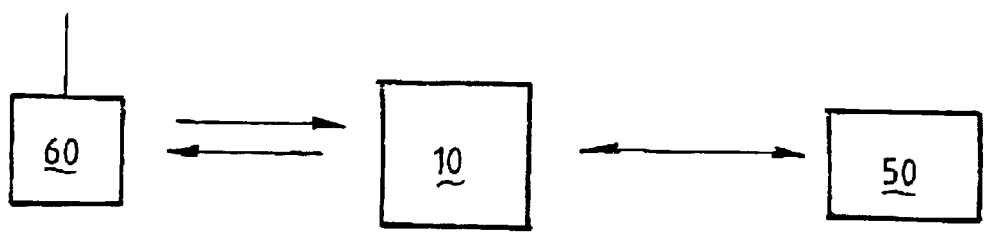
FIG. 3 and FIG. 4 show a still further embodiment of the invention.
Figure 4:
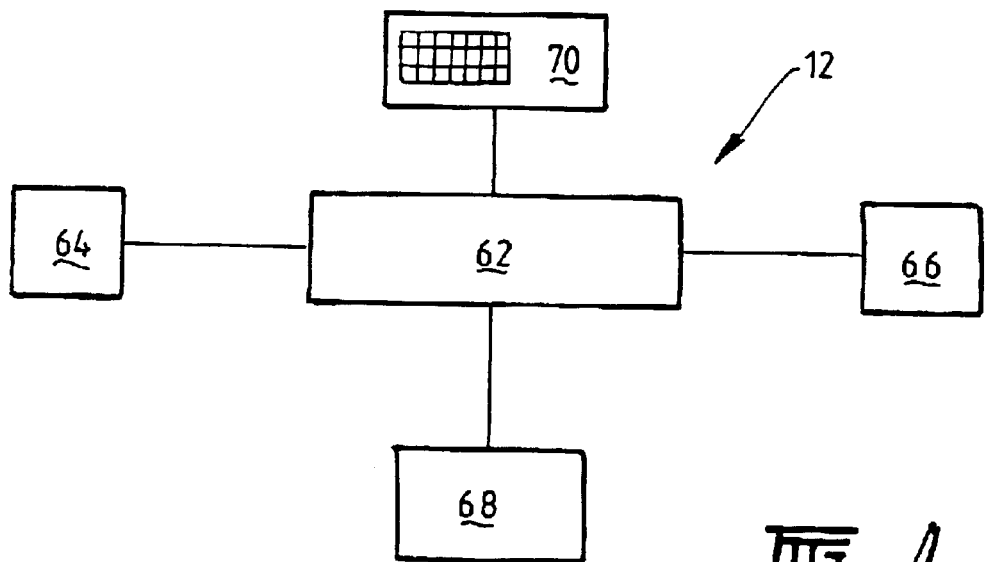

FIG. 3 shows a further embodiment which is similar to FIG. 1 except that in this embodiment the mobile communication from the telephone 60 makes contact with the parking meter 10 which in turn makes contact with the central station 50 so that data is relayed from the meter 10 to the station 50 and from the station 50 back to the meter 10 to activate the meter. The meter 10 is schematically shown in FIG. 4 and includes a microprocessor 62 which has a receiver 64 for receiving telephone calls from the telephone 60 and for processing those telephone calls. The processor 62 is also connected to a transmitter 66 for transmitting the information to the central station 50. The transmitter 66 may be a telephone which can either be an over the air telephone or a fixed land line telephone. A display 68 is provided for displaying information including the fact that parking has been paid for. The meter 10 may also include an input pad 70 for inputting information into the microprocessor 62 if required.

The embodiment of FIGS. 3 and 4 work in a similar way to the embodiment of FIG. 1 in that payment is made from an account or by credit card or the like and the central station 50 authorises payment and instructs the meter 10 that parking has been paid for and that the meter 10 should activate to indicate that a parking bay associated with the meter is in use and that parking has been paid. Once parking is almost complete a telephone call can be made to the user's mobile phone 60 from either central station 50 or the telephone 66 at the parking meter 10 to advise that parking is almost expired and inquiring whether additional time is needed.

The sensor system described with reference to FIG. 1 together with all the payment options described with reference to FIG. 1, can also be used in the embodiment of FIGS. 3 and 4.

This embodiment of the invention lends itself particularly to payments which are made automatically from a Smart Card or SIM Card associated with the telephone 60 of the type described with reference to FIG. 1. In this system, the telephone 60 can include a second SIM Card or integral Smart Card which includes a cash balance. The Smart Card or SIM Card balance can be increased by the user presenting a record or over the phone payment methods so that the balance of the SIM Card or Smart Card is increased by the user making appropriate payment to the car parking establishment or authority. When the user wishes to park at a parking meter 12 the user telephones the telephone number of the parking meter or a group of parking meters and enters a code relating to the parking meter concerned. The time parking is required is also entered by the keys of the mobile phone and the user is placed in communication with the processor 62 of the parking meter 10 in the same manner as previously described. The parking meter 10 can communicate back to the telephone 60 via the mobile phone terminal 66 requesting payment from the SIM Card or Smart Card which is integral with the telephone. The balance of the SIM Card or Smart Card in telephone 60 can be reduced according to the payment required and the parking meter 10 activates when the parking has been paid for. In this particular aspect of the invention it is not necessary for the parking meter 10 to communicate with the central station 50 because the complete transaction can be completed from the parking meter 10 by way of reducing the balance of the Smart Card or SIM Card associated with the mobile phone 60 to make payment for the parking. Since the user is at the parking bay concerned it is not necessary to transmit authorisation codes or the like to permit parking or entry into a parking station and the user can obtain from a visual inspection of the parking meter 10 a clear indication that parking has been paid for and that the parking meter 10 has been activated to indicate that the car is not illegally parked in the parking space.

Since modifications within the spirit and scope of the invention may readily be effected by persons skilled within the art, it is to be understood that this invention is not limited to the particular embodiment described by way of example hereinabove.

In this embodiment if the user overstays the parking time which was previously paid for when the mobile telephone 60 made initial contact with the central station 50, the additional parking time can be paid for by the user when the user leaves the parking station.

The claims defining the invention are as follows:

1. A parking system, including:
    a parking meter for location in proximity to a parking bay;
    the parking meter having communication means for receipt and/or transmission of data to a remote location;
    wherein in order to operate the parking meter a user is able to transmit information via a transmitter means so as to activate the parking meter and make payment for parking time spent in the parking bay controlled by the parking meter; and wherein the transmitter means comprises a user's mobile telephone and the user telephones a telephone number associated with the parking meter in order to initiate payment and activate the parking meter to indicate that parking has been paid for.

2. The system of claim 1 wherein the user's telephone call is received by a receiver within the parking meter which transmits data to a central location to deduct payment from the user's account.

3. A parking system, including;
a parking meter for location in proximity to a parking bay;
the parking meter having communication means for receipt and/or transmission of data to a remote location;
wherein in order to operate the parking meter a user is able to transmit information via a transmitter means so as to activate the parking meter and make payment for parking time spent in the parking bay controlled by the parking meter; and
wherein a central control station is provided which communicates with each of the parking meters in the system and the user telephones the central control unit which deducts payments from the user's account or otherwise initiates payment and transmits data to the parking meter to indicate that payment has been made and to activate the parking meter to display that payment has been made.

4. A parking system, including;
a parking meter for location in proximity to a parking bay;
the parking meter having communication means for receipt and/or transmission of data to a remote location;
wherein in order to operate the parking meter a user is able to transmit information via a transmitter means so as to activate the parking meter and make payment for parking time spent in the parking bay controlled by the parking meter; and
wherein the communication means includes a telephone terminal for receiving telephone calls from a user so that the user can make a direct telephone call to the parking meter to pay for parking time.

5. The system according to claim 4 wherein payment is deducted from a payment card associated with the user's telephone by direct communication between the user's telephone and the parking meter.

6. A parking system, including;
a parking meter for location in proximity to a parking bay;
the parking meter having communication means for receipt and/or transmission of data to a remote location;
wherein in order to operate the parking meter a user is able to transmit information via a transmitter means so as to activate the parking meter and make payment for parking time spent in the parking bay controlled by the parking meter; and
wherein the communication means includes a telephone terminal and a central control station is includes in the system and wherein, in order to pay for parking, the user makes a telephone call to the central station which in turn transmits a telephone call to the parking meter to activate the parking meter and to indicate that payment has been made for parking.

7. A parking system, including;
a parking meter for location in proximity to a parking bay, the parking meter having communication means for receiving and transmitting data;
a central control station for communicating with the communication means of the parking meter;

wherein, in use, a user is able to transfer information via a transmitter means to the central control station and input information relating to the parking meter via the transmitter means to the control station whereby the control station transmits data to the communication means of the parking meter to cause the parking meter to indicate that payment has been made for the parking space for a particular time period; and
wherein the transmitter means comprises a mobile telephone but other devices such as pagers or unique over the air transmitters for communicating with the central control station could be utilised.

8. The system of claim 7 wherein the parking meter may also have payment receiving means for receiving cash payments or smart card or credit card payments.

9. The system of claim 7 wherein the parking meter includes a display for displaying instructions and information relating to the commencement of parking time and the parking time remaining.

10. The system of claim 7 wherein the parking meter may also include an advertising display for displaying advertising material which may be included within the first mentioned display or separate from the first mentioned display.

11. The system of claim 7 wherein the parking meter is associated with a plurality of car parking bays, each car parking bay having a sensor for sensing the presence of a vehicle within the bay so that the parking meter is provided with information as to the presence of a vehicle within a particular bay and the communication means is able to transmit data relating to an overstay of a vehicle within a parking bay to either the central control station or to a separate enforcement office.

12. A parking meter for a parking system, said parking meter including;
a communication means for communicating with a remote location and for receiving information transmitted back from the remote location to activate the parking meter to show parking has been paid for a predetermined time period; and
wherein the communication means communicates with a telephone associated with a user of the parking space in order to initiate payment for the parking space.

13. The system of claim 12 wherein the communication means is a wireless communication link.

14. The parking meter of claim 12 wherein the communication means communicates with a central station via a wireless or fixed land line communication link.

15. The system of claim 14 wherein communication between the user and the central station is direct from the user to the central station.

16. The system according to claim 14 wherein the communication between the user and the central station is via the parking meter which receives the communication from the user and transmits data relating to the communication to the central control station.

17. The system of claim 12 wherein the communication between the central control station and the communication means within the parking meter is by a fixed land line.

18. A parking payment method including the steps of:
providing a central facility to which a user can make a telephone call to request parking;
taking payments for the parking which is required; and
transmitting information to a parking facility relating to the parking which is required by the user.

19. The method of claim 18 wherein the step of transmitting information includes transmitting a code identifying the user to the parking facility, transmitting the code to the user so that when the user arrives at the parking facility the user can present the code to the parking facility to identify the user.

20. The method according to claim 18 wherein the step of transmitting information includes the step of transmitting data to a parking meter to activate the parking meter to indicate that payment for parking associated with the parking meter has been made.

21. A parking payment method including the steps of:
providing a parking meter which includes communication means for receiving a telephone call from a user;
receiving a call from a user to initiate parking at the parking meter;
taking payment for the parking which is required; and
activating the parking meter to indicate that the parking meter is active and that payment has been made for parking.

22. The method of claim 21 wherein the call from the user is received by the terminal via a central station which relays a message from the central station to the parking meter.

23. The method of claim 21 wherein the user makes direct contact with the terminal by making a call to a telephone receiver associated with the meter.

24. A parking meter for location in proximity to a parking bay in which a vehicle can park, the parking meter including;
communication means for receiving a mobile telephone call from a user intending to park in a parking bay associated with the meter;
an input means for allowing input of data by the user; and
the communication means being for transmitting information to a central station relating to the required parking by the user so the central station can attend to billing in relation to the parking.

25. The parking meter according to claim 24 wherein the communication means includes a call back facility for calling the users mobile telephone to advise that parking time will expire and requesting input from the user as to whether further parking time is required.

26. A parking system including;
a central facility;
a plurality of parking meters each located in proximity to one or more parking bays in which a vehicle can park, each parking meter including;
a communication means for receiving a mobile telephone from a user to initiate parking within a bay associated with the parking meter, the communication means also being for transmitting data relating to parking to the central facility; and
input means for receiving user input relating to the required parking.

* * * * *